United States Patent [19]

Lentini

[11] Patent Number: 5,440,773
[45] Date of Patent: Aug. 15, 1995

[54] FOLDABLE RAMP

[75] Inventor: Robert A. Lentini, Pensacola, Fla.

[73] Assignee: Daws Manufacturing Co., Inc., Pensacola, Fla.

[21] Appl. No.: 118,230

[22] Filed: Sep. 9, 1993

[51] Int. Cl.6 .............................................. E01D 15/22
[52] U.S. Cl. ...................................... 14/69.5; 16/369
[58] Field of Search ................. 16/246, 247, 358, 369; 14/69.5, 71.1

[56] References Cited

U.S. PATENT DOCUMENTS

| 1,504,744 | 8/1924 | Cox . | |
|---|---|---|---|
| 1,635,462 | 7/1927 | Cummings . | |
| 1,659,928 | 2/1928 | Townsend . | |
| 2,122,301 | 6/1938 | Soss et al. | 16/39 |
| 2,141,529 | 12/1938 | Gravelle . | |
| 3,352,440 | 11/1967 | Wilson . | |
| 3,517,772 | 6/1970 | Weis et al. . | |
| 3,642,156 | 2/1972 | Stenson . | |
| 3,735,454 | 1/1973 | Curtis et al. . | |
| 4,127,201 | 11/1978 | Baumann | 214/85 |
| 4,735,454 | 4/1988 | Bernard | 296/61 |
| 4,874,284 | 10/1989 | New, Jr. | 414/537 |
| 5,133,584 | 7/1992 | McCleary | 296/61 |
| 5,156,432 | 10/1992 | McCleary | 296/61 |
| 5,325,558 | 7/1994 | Labreche | 14/69.5 |

FOREIGN PATENT DOCUMENTS 499208  1/1939  United Kingdom .
WO89/06199  7/1989  WIPO .

Primary Examiner—Ramon S. Britts
Assistant Examiner—Pamela A. O'Connor
Attorney, Agent, or Firm—Finnegan, Henderson, Farabow, Garrett & Dunner

[57] ABSTRACT

A foldable ramp includes first and second sections longitudinally aligned with each other and joined by a hinge assembly permitting the sections to be pivoted to a working position in which the sections form a continuous, substantially straight ramp with adjoining ends abutting against each other and a storage position in which one of the first and second ramp sections is folded against the other. The hinge assembly includes four links extending along the first and second ramp sections and first and second pins transversely extending through the first and second ramp sections, respectively, and through each of the links.

20 Claims, 3 Drawing Sheets

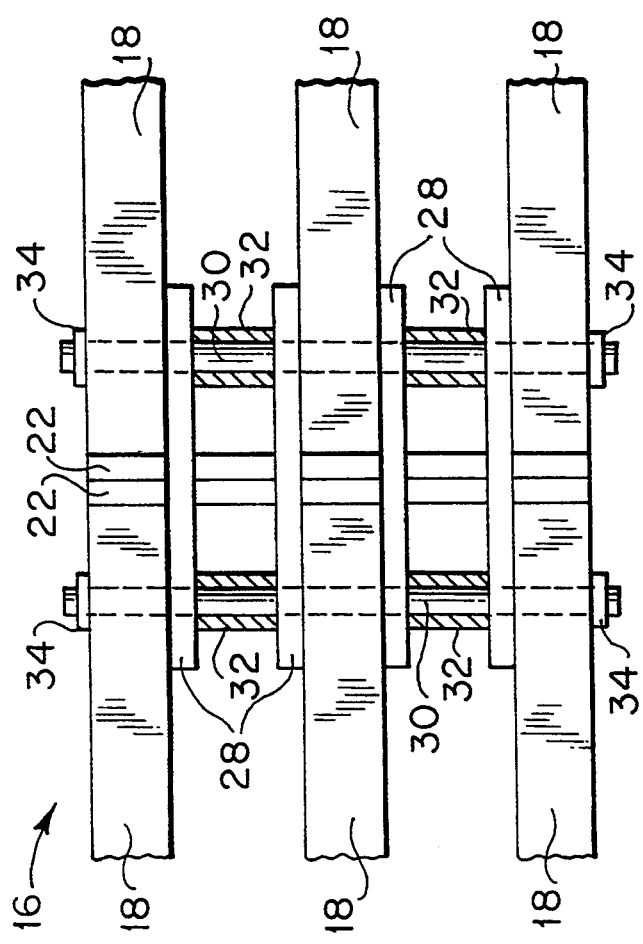
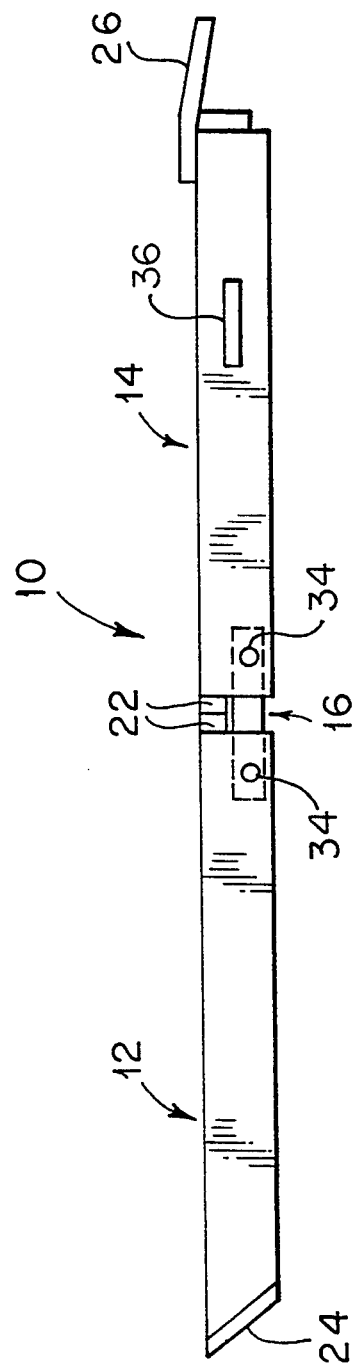

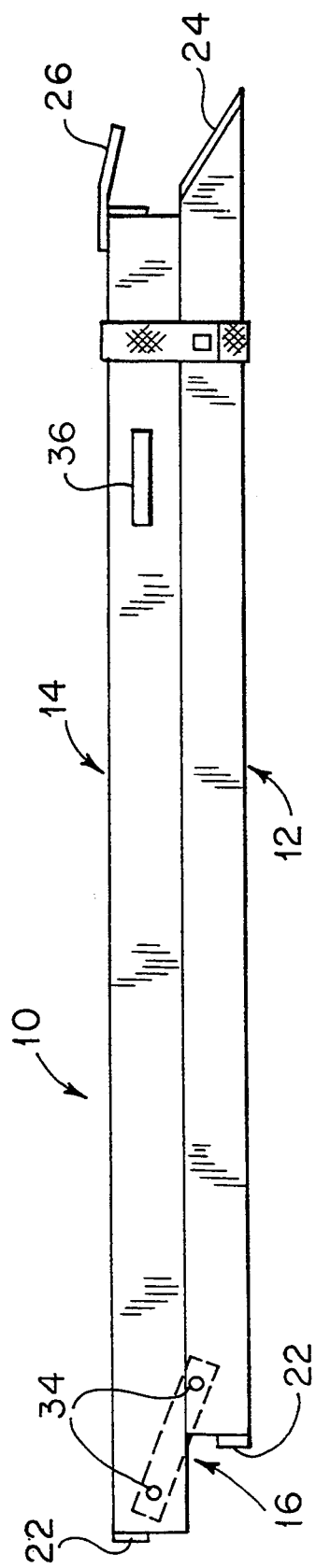
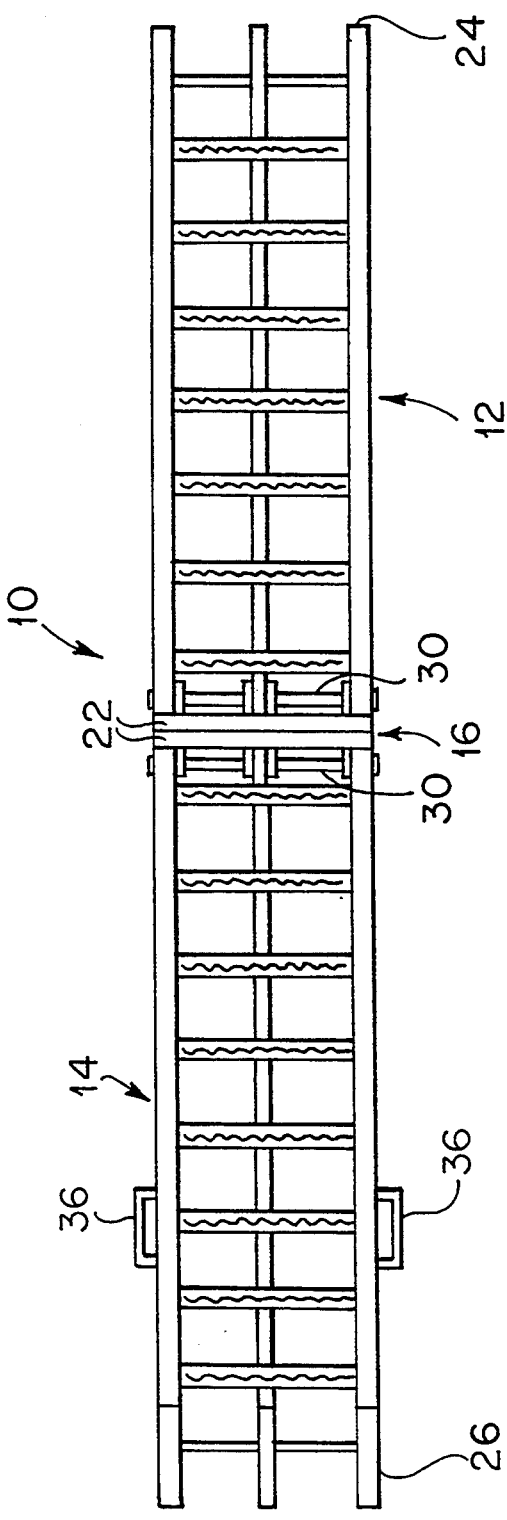

FOLDABLE RAMP

BACKGROUND OF THE INVENTION

1. Field of the Invention

The present invention relates to ramps. More particularly, the present invention relates to foldable ramps for use in loading equipment onto raised surfaces.

2. Description of the Related Art

Small equipment, such as all terrain vehicles, riding lawn mowers, and the like sometimes must be transported from place to place for usage. Small equipment like this may be physically lifted by the mover into the bed of a pickup truck, trailer, van, or whatever type of vehicle is moving the equipment, but this could result in injury to the mover from the strain of the lift. In addition, if the equipment is very heavy or cumbersome, more than one person may be required to physically lift equipment into the vehicle. Obviously, this is an inconvenience when there is only one person available. Therefore, ramps are sometimes used to load small equipment into the cargo area of vehicles.

One advantage of loading equipment using a ramp is that one person is able to load the equipment, when it might ordinarily take more than one person. However, if the ramp is too heavy or cumbersome for one person to handle, that advantage is cancelled out. On the other hand, if the ramp is made from lightweight material according to conventional ramp designs, it may be too weak to sustain the weight of the equipment being loaded. In addition, the ramp must store easily, for instance, in the bed of a pickup truck, for convenient usage. Therefore, there is a need for a lightweight, strong ramp which is easily storable.

The prior art fails to adequately solve these and other problems and needs. For example, U.S. Pat. No. 4,874,284 issued to New, Jr. describes a ramp for loading all terrain vehicles into the bed of a pickup truck. However, the mechanical design of the ramp does not lend itself to both strength and lightness.

In addition, U.S. Pat. Nos. 3,352,440 to Wilson, 3,713,553 to Curtis et al., 4,735,454 to Bernard, and 4,127,201 to Baumann all describe various kinds of ramps. In the inventor's opinion, these too fail to satisfy the need for a ramp which is strong, lightweight, easily operable, and conveniently storable.

SUMMARY OF THE INVENTION

Accordingly, the present invention is directed to a foldable ramp that substantially obviates one or more of the problems due to limitations and disadvantages of the related art.

To achieve the advantages of the invention and in accordance with the purpose of the invention, as embodied and broadly described herein, the invention comprises a foldable ramp including first and second elongated ramp sections longitudinally aligned with each other and joined proximate the adjoining ends by a hinge assembly permitting the sections to be pivoted to a working position in which the sections form a continuous, substantially straight ramp with the adjoining ends abutting against each other, and a storage position in which one of the first and second ramp sections is folded against the other. The hinge assembly includes at least two links extending along the first and second ramp sections and positioned proximate the adjoining ends, each of the links have first and second ends located adjacent the first and second ramp sections, respectively. A first pin transversely extends through the first ramp section and through each of the first ends of the at least two links, and a second pin transversely extends through the second ramp section and through each of the second ends of the at least two links. The first and second pins are located so that when the first and second ramp sections are rotated in a first rotational direction to the working position, the adjoining ends of the ramp sections abut against each other and prevent the further rotation of the ramp sections in the first rotational direction. The first and second pins are preferably located so that when the first and second ramp sections are rotated in a second rotational direction from the working position to the storage position, the first and second ramp sections fold against each other along substantially their entire longitudinal length. In a preferred embodiment, each of the first and second ramp sections includes at least two longitudinal members extending parallel to each other and a plurality of cross rungs joining the longitudinal members together, and the longitudinal members and plurality of cross members associated with a ramp section cooperate to provide a ramp surface. The ramp further includes spacers mounted on the first and second pins and positioned between the longitudinal members.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

FIG. 3 is a plan partial view of the hinge subassembly of the present invention.

FIG. 4 is a side view of an embodiment of the present invention showing the hinge and abutment surfaces abutting against each other in the working position.

FIG. 5 is a side view of an embodiment of the present invention in the storage position.

FIG. 6 is a top view of an embodiment of the present invention in the working position.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
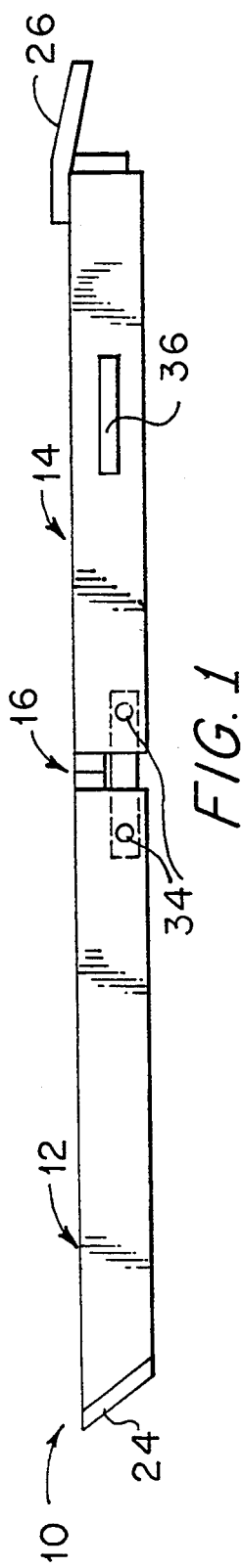
FIG. 1 is a side view of an embodiment of the present invention.

The foldable ramp of the present invention, as embodied herein and shown in FIG. 1, is designated generally by reference numeral 10. The foldable ramp includes a first ramp section 12 and a second ramp section 14. First and second ramp sections 12, 14 are elongated and longitudinally aligned with each other to form a continuous, substantially flat surface for moving equipment along to load onto a raised platform. First and second ramp sections 12, 14 are joined at adjoining ends by a hinge assembly 16. Hinge assembly 16, described in detail below, permits first and second ramp sections 12, 14 to be pivoted to a working position (shown in FIG. 1) in which the first and second sections 12, 14 form a continuous, substantially straight ramp and to a storage position (not shown), where one of the first and second ramp sections 12, 14 is folded against the other. Three or more ramp sections can be joined by the hinge assembly to make a longer ramp, depending upon the application. Of course, any additional ramp sections would be foldable against each other for convenient storage.

Figure 2:
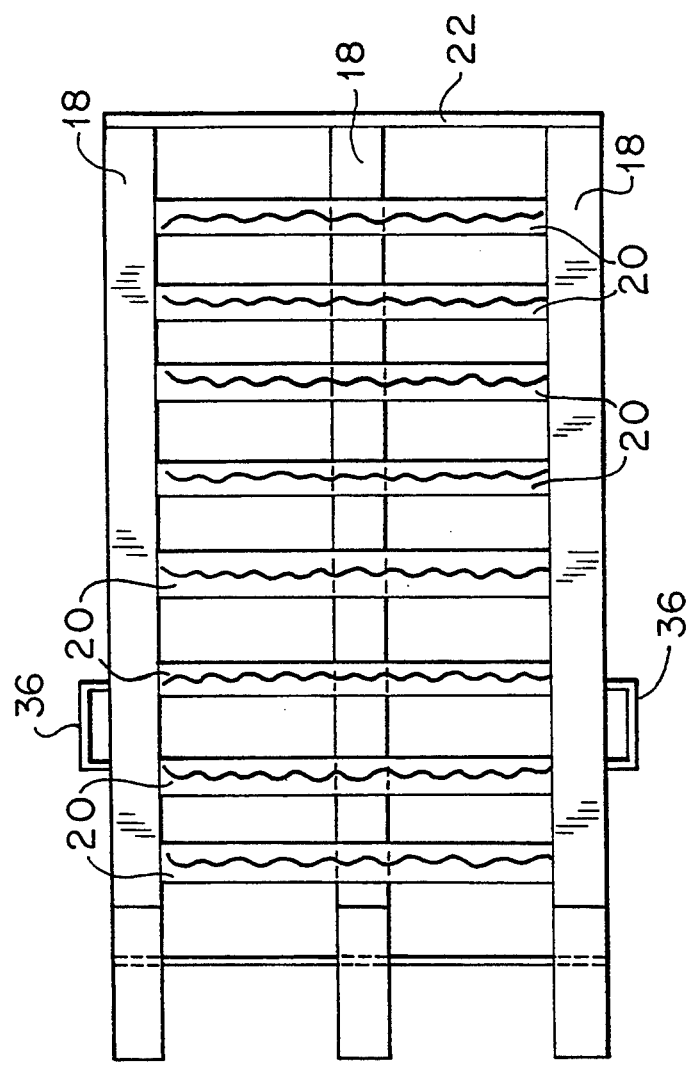
FIG. 2 is a top view of one longitudinal ramp section of the embodiment of the present invention shown in FIG. 1.

FIG. 2 illustrates a top view of one of first and second ramp sections 12, 14. First and second ramp sections 12, 14 are constructed substantially identically, with the exception of fingers on one end of second ramp section 14, and a ground engaging portion on one end of first ramp section 12, described below. As shown in FIG. 2, each first and second ramp section 12, 14 includes a plurality of longitudinal members 18. In the illustrated embodiment, each of first and second ramp section 12, 14 has three longitudinal members 18 extending parallel to each other and along the entire length of a respective first and second ramp section 12, 14. Longitudinal members 18 each include holes at an end near the adjoining ends for receipt of a pin in the hinge assembly 16, described below. Longitudinal members 18 are preferably made of hollow rectangular aluminum bar stock. However, longitudinal members 18 could also be constructed out of other lightweight material, provided that there is sufficient strength to sustain a load. Less or more than three longitudinal members may be used, depending on the load requirements.

Longitudinal members 18 are joined by a plurality of cross rungs 20. Cross rungs 20 extend transversely across longitudinal members 18 and are positioned to be spaced from each other generally from one end of each of the first and second ramp sections 12, 14 to the opposite end. In the preferred embodiment, each cross rung 20 has a knurled outer surface to provide traction for equipment being loaded with the ramp 10. The cross rungs 20 are preferably made from aluminum stock and are securely fixed to longitudinal members 18 by welding, for example. In a preferred embodiment, the top surface of the cross rungs 20 are preferably aligned with the top surface of at least the middle longitudinal member 18 and slightly recessed with respect to the two outside longitudinal members 18. As such, rungs 20 and longitudinal members 18 cooperate to form a generally planar ramp surface with a small raised surface at the outer edges to prevent equipment being loaded from rolling over the edges. Obviously, cross rungs 20 could be fixed to the longitudinal members 18 by other conventional ways, such as bolting, riveting, and the like. In addition, the top surface of each of the cross rungs 20 can be aligned with the top surface of each of the longitudinal members 18 to form a flat planar ramp surface all the way across, instead of being recessed with respect to the longitudinal members 18 on the outside edges. Also, in the Figures, eight cross rungs 20 are shown for each of the first and second ramp sections 12, 14. Obviously, more or fewer cross rungs could be used depending upon the load.

In the preferred embodiment, each first and second ramp section 12, 14 includes an end member 22 which forms an abutting surface. Each end member 22 extends transversely across and is fixed to an upper region of each end of longitudinal members 18, at the adjoining ends of first and second ramp sections 12, 14. As such, end members 22 abut against each other when the ramp 10 is in the working position. The end members 22 in the preferred embodiment are made of aluminum and are fixed to the ends of longitudinal members 18 by welding, but they obviously could be attached by a variety of processes.

In the preferred embodiment, first ramp section 12 includes a ground engaging portion including a beveled end 24 at the end opposite to end member 22. Each of the longitudinal members 22 in first ramp section 12 has a beveled surface at its end opposite to end member 22 to comprise the beveled end 24. The beveled end 24 permits ramp 10 to rest securely on the ground when ramp 10 is in its working position for permitting equipment to be loaded.

Second ramp section 14 preferably includes fingers 26 extending from an end of each longitudinal member 18 opposite to end member 22. Fingers 26 are angled acutely with respect to longitudinal members 18, and permit ramp 10 to be secured against the surface, such as the bed of a truck, being loaded with the ramp 10. In the preferred embodiment, fingers 26 are aluminum and welded onto the top surface of each longitudinal member 18 of second ramp section 14. Each finger 26 is covered with a rubber material to protect the finish of both ramp 10 and the surface against which the ramp 10 is resting. Other types of attachments could be used in place of the fingers 26. For example, an elongated planar leaf extending over the full width of the ramp could be used depending on the ramp configuration and safety requirements.

The foldable ramp may include any one of several safety attachments (not shown) for ensuring that the ramp stays set up on the edge of the loading surface. For example, a safety attachment could include a strong cable, preferably steel, having an "S" hook at one end and a closed loop at the opposite end, fixed by conventional means (e.g., a clamp) to a portion of the second ramp section 14. The "S" hook is positioned to engage any type of hooking surface on the loading surface. Two safety attachments may be used, one on each lateral side of the ramp. If the ramp were to slip off of the edge of the loading surface, the safety attachments would save the ramp from crashing against the ground. Obviously, other ways of securing the ramp may be used as well.

In accordance with the invention, the foldable ramp includes a hinge assembly. As embodied herein, and as shown in FIG. 3, a hinge assembly 16 includes four links 28 extending along first and second ramp sections 12, 14 and proximate to the end members 22. Each link 28 is positioned adjacent to and in contact with at least one of the longitudinal members 18 in both the first and second ramp sections 12, 14. Each link 28 has a substantially rectangular cross-section, and includes two holes positioned near opposite ends for receipt of pins, described below. Links 28 are preferably made of aluminum but could be made from a variety of materials and contribute to the strength and structural integrity of ramp 10.

Hinge assembly 16 further includes two pins 30. One of the pins 30 extends transversely through the first ramp section 12 and through one of the holes in each of the links 28, so that the pin is rotatably positioned in the first ramp section 12. The other of the pins 30 extends transversely through the second ramp section 14 and through the other of the holes in each of the links 28, so that the pin is rotatably positioned in the second ramp section 14. In particular, for each of the first and second ramp section 12, 14, one of the pins 30 passes through the hole in each of the longitudinal members 18 and through one of the holes in each of the links 28. As such, links 28 and pins 30 pivotably secure the first ramp section 12 to the second ramp section 14. Pins 30 are made of steel and contribute to the strength and structural integrity of ramp 10. In the preferred embodiment, pins 30 are secured in place by four push nuts 34 to hold the pins in position. Other methods, such as threaded nuts and bolts, could also be used to form a similar strong connection. One of push nuts 34 is secured on each end of both of the pins 30, so that longitudinal members 18 and links 28 are prevented from sliding off of the pins 30.

In the preferred embodiment, the abutting surfaces formed by end members 22 are positioned above the axes of transverse pins 30. As a result, when the ramp is rotated in a front rotational direction to the working position, the adjoining ends of the ramp sections, formed by end members 22, abut against each other and the relationship of the pins, links, and section members prevent the further rotation of the ramp section. Preferably, the first and second pins are spaced from each other in a manner such that when the ramp sections are rotated in a second directional rotation from the working position to the storage position, the first and second ramp sections fold against each other along substantially their entire longitudinal length. In an alternate embodiment, the pins are positioned in the longitudinal members 18 so that when the end members 22 abut, the first and second ramp sections 12, 14 are angled with respect to each other. Specifically, the angle formed between the bottom surfaces of the first and second ramp surfaces 12, 14 is about 170 to 172 degrees so that an upwardly arched ramp surface is formed. This arched surface allows a smooth transition for low ground clearance objects along the ramp and onto the loading surface.

Hinge assembly 16 further includes four spacers 32, two of which are mounted on each of the pins 30. Spacers 32 are hollow, tubular shaped and positioned between links 28 and longitudinal members 18, so that the arrangement on each pin 30 is the following order: push nut 34, longitudinal member 18, link 28, spacer 32, link 28, longitudinal member 18, link 28, spacer 32, link 28, longitudinal member 18, and push nut 34. As shown, the ends of the spacers 32 abut against the links 28, so that the longitudinal members 18, links 28, and spacers 32 are transversely held in place, when the pins are held in place by push nuts 34. As such, each of the spacers 32 keeps links 28 spaced from each other and prevents links 28 and longitudinal members 18 from sliding into each other. Spacers are made of aluminum hollow stock, but obviously could be made from a variety of materials.

The hinge assembly 16 permits equalization of the first and second ramp sections 12, 14 if either the ground or the loading surface is uneven. For example, if the ground is not level, the hinge assembly will allow the bottom edge of the first ramp section 12 to evenly hug the ground surface, even while maintaining an even alignment with the loading surface. If, on the other hand, the loading surface is uneven, the hinge assembly allows the second ramp section 14 to evenly rest against the loading surface while the first ramp section 12 rests evenly against the ground. In such a position, the ramp is still strong and stable, and may easily be returned to its folded, storage position.

In the preferred embodiment, at least one handle 36 is fixed to the outer side of one of the first and second ramp sections 12, 14. A user of the ramp can then simply lift the folded ramp by the handle and store it where desired.

In use, foldable ramp 10 can be used to load equipment onto a raised platform, such as the cargo area of a truck, plane, van, car, or the like. The ramp is rotated in a first rotational direction from the storage position to a working position, in which the first and second ramp sections 12, 14 form a continuous, substantially straight ramp with end members 22 abutting against each other. First ramp section 12 is positioned against the ground so that bevelled end 24 is flush with the ground surface, while second ramp section 14 is positioned against the raised platform with fingers 26 resting on a surface of the platform. One or more ramps of the present invention can be positioned between the ground and the raised platform. One or more of several types of safety attachments, such as the safety cable described above, may be connected between the ramp(s) and the loading surface to ensure that the ramp stays set up on the edge of the loading surface. The equipment to be loaded is then rolled, driven, or slid along the surface of the ramp(s), from the bottom of the ramp 10, along the surface of cross rungs 20 in first ramp section 12, over end members 22 and hinge assembly 16, along the surface of cross rungs 20 in second ramp section 14, and finally onto the platform. When loading is completed, ramp 10 is then rotated in a second direction and placed in a storage position, where first ramp section 12 is folded against second ramp section 14 by operation of the hinge assembly 16.

When the ramp of the present invention is rotated to the storage position, ramp 10 is easily stored in, for example, the bed of a pickup truck. When unloading equipment, ramp 10 is unfolded from its storage position to its working position. The ramp is positioned in the same manner as when loading the equipment, and the equipment may be rolled or slid downward from the platform, over cross rungs 20 in the second ramp section 14, over the hinge assembly 16, over the cross rungs 20 in the first ramp section 12, and finally to the ground. The ramp 10 again may be put into its storage position by folding first ramp section 12 against second ramp section 14 by operation of hinge assembly 16.

In a preferred application of the present invention, two ramps of the present invention are used to load and unload equipment from a pickup truck. Each ramp has a width of approximately 11 inches and a longitudinal length of approximately 7 feet. Each section of a ramp therefore has a length of approximately 3.5 feet. In the embodiment used for this application, the longitudinal members are aluminum rectangular, hollow stock (1 inch by 2 inches) having a thickness of 0.100 inch. The links are made from extruded bar aluminum, and the pins are made from steel. The link members in their embodiment are 0.50 inch thick, 1 inch wide, and 6.875 inches long. The end members 22 are made of extruded bar stock aluminum and are 0.375 inch thick and 1 inch wide. The axes of pins 34 are spaced from each other by 5.375 inches. It has been found that such ramps carry loads (such as small tractors, recreational vehicles, mowers, etc.) typically loaded onto a truck. Such ramps also are relatively lightweight and store easily in the back of a truck.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A foldable ramp comprising:
    first and second elongated ramp sections longitudinally aligned with each other and joined proximate the adjoining ends by a hinge assembly permitting said sections to be pivoted to a working position in which said sections form a continuous, substantially straight ramp and a storage position in which one of the first and second ramp sections is folded against the other;
    each of said ramp sections having at its respective adjoining end a traverse end member that forms an elongated, planar abutment surface substantially perpendicular to the longitudinal axis of the ramp section;
    said end members being formed such that said abutment surfaces of said first and second ramp sections abut against each other when the ramp is pivoted to its working position;
    said hinge assembly including,
        at least two links extending along said first and second ramp sections and positioned proximate the adjoining ends, each of said links having first and second ends located adjacent said first and second ramp sections, respectively;
        a first pin transversely and rotatably extending through said first ramp section and through each of said first ends of said at least two links; and
        a second pin transversely and rotatably extending through said second ramp section and through each of said second ends of said at least two links;
        said first and second pins being located so that when said first and second ramp sections are rotated in a first rotational direction to the working position, the abutment surfaces of the ramp sections abut against each other and prevent the further rotation of the ramp sections in the first rotational direction.

2. The ramp of claim 1, wherein said first and second pins are located in said hinge assembly so that when said first and second ramp sections are rotated in a second rotational direction from the working position to the storage position, the first and second ramp sections fold against each other along substantially their entire longitudinal length.

3. The ramp of claim 2, wherein each of said ramp sections have a top and a bottom surface, and said first and second pins extend through said sections at locations more proximate the bottom surface than the top surface.

4. The ramp of claim 3, wherein the abutment surfaces of the adjoining ends of said ramp sections that abut against each other when the ramp sections are in the working position are located above the transverse axes of said first and second pins.

5. The ramp of claim 1 wherein each of the first and second ramp sections includes at least two longitudinal members extending parallel to each other and a plurality of cross rungs joining said longitudinal members together.

6. The ramp of claim 5, wherein said longitudinal members and said plurality of cross members associated with a ramp section cooperate to provide a ramp surface.

7. The ramp of claim 5 wherein said first pin extends continuously through each of the two longitudinal members of the first ramp section and said second pin extends continuously through each of the two longitudinal members of the second ramp section.

8. The ramp of claim 5, further comprising spacers mounted on said first and second pins and positioned between said longitudinal members.

9. The ramp of claim 8, wherein at least one spacer is mounted between said links.

10. The ramp of claim 1 wherein each of the first and second ramp sections includes three longitudinal members extending parallel to each other.

11. The ramp of claim 10 wherein the hinge assembly has four links, the first pin extends continuously through each of the three longitudinal members of the first ramp section and each of the first ends of the four links, and the second pin extends continuously through each of the three longitudinal members of the second ramp section and each of the second ends of the four links.

12. The ramp of claim 11, further comprising a plurality of spacers, each of said spacers being mounted on one of said first and second pins, each of said spacers further being mounted between two of said links and two of said longitudinal members, with the ends of said spacers abutting against said links.

13. The ramp of claim 1, wherein one of the first and second ramp sections has a finger extending from an end opposite to the end proximate to the hinge assembly for engaging a raised surface, and the other of the first and second ramp sections has a ground engaging portion on an end opposite to the end proximate to the hinge assembly.

14. The ramp of claim 1 wherein said links and said pins are made of a strong, dense material, and the first and second ramp sections are made from a more lightweight material.

15. A foldable ramp for moving loads onto a raised surface, the ramp comprising:
    first and second elongated ramp sections longitudinally aligned with each other and joined proximate the adjoining ends by a hinge assembly permitting said sections to be pivoted to a working position in which said sections form a continuous, substantially straight ramp and a storage position in which one of the first and second ramp sections is folded against the other;
    each of said ramp sections having at its respective adjoining end a traverse end member that forms an elongated, planar abutment surface substantially perpendicular to the longitudinal axis of the ramp section;
    said end members being formed such that said abutment surfaces of said first and second ramp sections abut against each other when the ramp is pivoted to its working position;
    each of the first and second ramp sections including at least two longitudinal members extending parallel to each other and a plurality of cross rungs joining said longitudinal members together, said longitudinal members and said plurality of cross members associated with a ramp section cooperating to provide a ramp surface; and said hinge assembly including,
   at least two links, each extending along one of the at least two longitudinal members of said first and second ramp sections and positioned proximate the adjoining ends, each of said links having first and second ends located adjacent said first and second ramp sections, respectively;
   a first pin transversely and rotatably extending through the at least two longitudinal members of said first ramp section and through each of said first ends of said at least two links; and
   a second pin transversely and rotatably extending through the at least two longitudinal members of said second ramp section and through each of said second ends of said at least two links;
   said first and second pins being located so that when said first and second ramp sections are rotated in a first rotational direction to the working position, the abutment surfaces of the ramp sections abut against each other and prevent the further rotation of the ramp sections in the first rotational direction.

16. The foldable ramp of claim 15, further comprising a plurality of spacers, each of said spacers being mounted on one of said first and second pins and being positioned between said links, with the ends of the spacers abutting against said links.

17. The foldable ramp of claim 15, wherein said first and second pins are located in said hinge assembly so that when said first and second ramp sections are rotated in a second rotational direction from the working position to the storage position, the first and second ramp sections fold against each other along substantially their entire longitudinal length.

18. A ramp comprising:
   first and second elongated ramp sections longitudinally aligned with each other and joined proximate the adjoining ends by a hinge assembly permitting said sections to be pivoted to a working position in which said sections form a continuous, substantially straight ramp, and a storage position in which one of the first and second ramp sections is folded against the other;
   each of said ramp sections having at its respective adjoining end a traverse end member that forms an elongated, planar abutment surface substantially perpendicular to the longitudinal axis of the ramp section;
   said end members being formed such that said abutment surfaces of said first and second ramp sections abut against each other when the ramp is pivoted to its working position;
   each of the first and second ramp sections having three longitudinal members;
   first and second traverse end members, the first end member being fixed to each end proximate to the hinge assembly of each of the three longitudinal members in the first ramp section, the second end member being fixed to each end proximate to the hinge assembly of each of the three longitudinal members in the second ramp section;
   said hinge assembly includes,
      four links connecting the first and second ramp sections, each of the links having first and second ends and extending along one of said three longitudinal members;
      a first pin transversely and rotatably extending from a side of the first ramp section to an opposite side of the first ramp section, the first pin passing continuously through each of the three longitudinal members of the first ramp section and through each of the first ends of the four links;
      a second pin transversely and rotatably extending from a side of the second ramp section to an opposite side of the second ramp section, the second pin passing continuously through each of the three longitudinal members of the second ramp section and through each of the second ends of the four links; and
      said first and second pins being located so that when said first and second ramp sections are rotated in a first rotational direction to the working position, the abutment surfaces of the ramp sections abut against each other and prevent the further rotation of the ramp sections in the first rotational direction.

19. The ramp of claim 18 wherein said first and second pins are located in the hinge assembly so that when said first and second ramp sections are rotated in a second rotational direction from the working position to the storage position, the first and second ramp sections fold against each other along substantially their entire longitudinal length.

20. A foldable ramp consisting essentially of:
   first and second elongated ramp sections longitudinally aligned with each other and joined proximate the adjoining ends by a hinge assembly permitting said sections to be pivoted to a working position in which said sections form a continuous, substantially straight ramp, and a storage position in which one of the first and second ramp sections is folded against the other;
   each of said ramp sections having at its respective adjoining end a traverse end member that forms an elongated, planar abutment surface substantially perpendicular to the longitudinal axis of the ramp section;
   said end members being formed such that said abutment surfaces of said first and second ramp sections abut against each other when the ramp is pivoted to its working position;
   said hinge assembly consisting essentially of,
      at least two links extending along said first and second ramp sections and positioned proximate the adjoining ends, each of said links having first and second ends located adjacent said first and second ramp sections, respectively;
      a first pin transversely and rotatably extending through said first ramp section and through each of said first ends of said at least two links; and
      a second pin transversely and rotatably extending through said second ramp section and through each of said second ends of said at least two links;
      said first and second pins being located so that when said first and second ramp sections are rotated in a first rotational direction to the working position, the abutment surfaces of the ramp sections abut against each other and prevent the further rotation of the ramp sections in the first rotational direction.

* * * * *